United States Patent [19]
Kouno et al.

[11] Patent Number: 5,421,882
[45] Date of Patent: Jun. 6, 1995

[54] APPARATUS FOR GEL-COATING SEED

[75] Inventors: Yasushi Kouno; Takeo Hayashi, both of Shizuoka, Japan

[73] Assignee: Yazaki Corporation, Tokyo, Japan

[21] Appl. No.: 53,490

[22] Filed: Apr. 28, 1993

Related U.S. Application Data

[62] Division of Ser. No. 769,261, Oct. 1, 1991, Pat. No. 5,254,358.

[30] Foreign Application Priority Data

| Oct. 2, 1990 | [JP] | Japan | 2-263071 |
| Oct. 2, 1990 | [JP] | Japan | 2-263072 |
| Oct. 2, 1990 | [JP] | Japan | 2-263073 |
| Oct. 2, 1990 | [JP] | Japan | 2-263074 |

[51] Int. Cl.⁶ .................... B05C 3/09; B05C 11/00
[52] U.S. Cl. .................. 118/23; 118/29; 118/31; 118/400; 118/500; 118/506
[58] Field of Search ........... 118/23, 26, 29–31, 118/75, 400, 428, 500, 506; 427/4, 212; 47/57.6; 221/209, 211, 278; 222/496, 518

[56] References Cited

U.S. PATENT DOCUMENTS

| 2,766,478 | 10/1956 | Raley, Jr. et al. | |
| 3,991,705 | 11/1976 | Adler | 118/696 |
| 4,626,167 | 12/1986 | Bond et al. | 221/211 |
| 4,657,773 | 4/1987 | Mueller . | |
| 4,806,357 | 2/1989 | Garrett et al. | |
| 4,808,430 | 2/1989 | Kouno . | |
| 5,080,925 | 1/1992 | Kouno . | |
| 5,107,787 | 4/1992 | Kouno . | |

FOREIGN PATENT DOCUMENTS

| 130096 | 3/1978 | German Dem. Rep. | 118/30 |
| 303014 | 6/1991 | U.S.S.R. | 221/211 |

*Primary Examiner*—W. Gary Jones
*Assistant Examiner*—Steven P. Griffin
*Attorney, Agent, or Firm*—Armstrong, Westerman, Hattori, McLeland & Naughton

[57] ABSTRACT

A gel-coating apparatus for seeds comprising: a nozzle portion for forming and cutting a gel coating film by opening and closing operation of a cutting plunger; a seed storing vessel moving upward and downward; an arm having a rotation shaft at the center thereof and a hollow needle at both ends thereof; a seed supply portion having pipes for communicating the needles with a negative pressure source and a positive pressure source by way of electromagnetic valves; a curing vessel provided below the nozzle portion; and a control section for synchronously operating the movement of the curing vessel, the nozzle portion, the seed storing vessel, the arm, and the seed supply portion. With the above apparatus, a method of gel-coating seeds according to the present invention comprising the steps of gel-coating seeds into a larger spherical form, immersing the seed into a curing agent for a predetermined period of time to cure the surface of the gel-coating layer and, subsequently, taking the gel-coated seed out of the curing agent, washing out the deposited curing agent with water and curing only the surface of the layer.

9 Claims, 10 Drawing Sheets

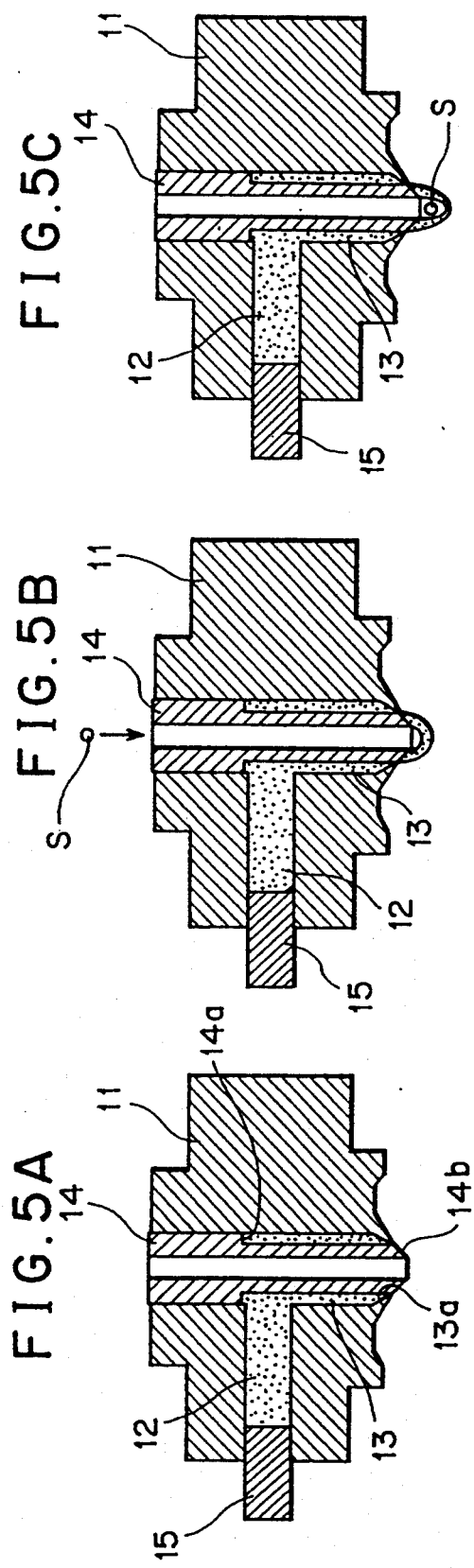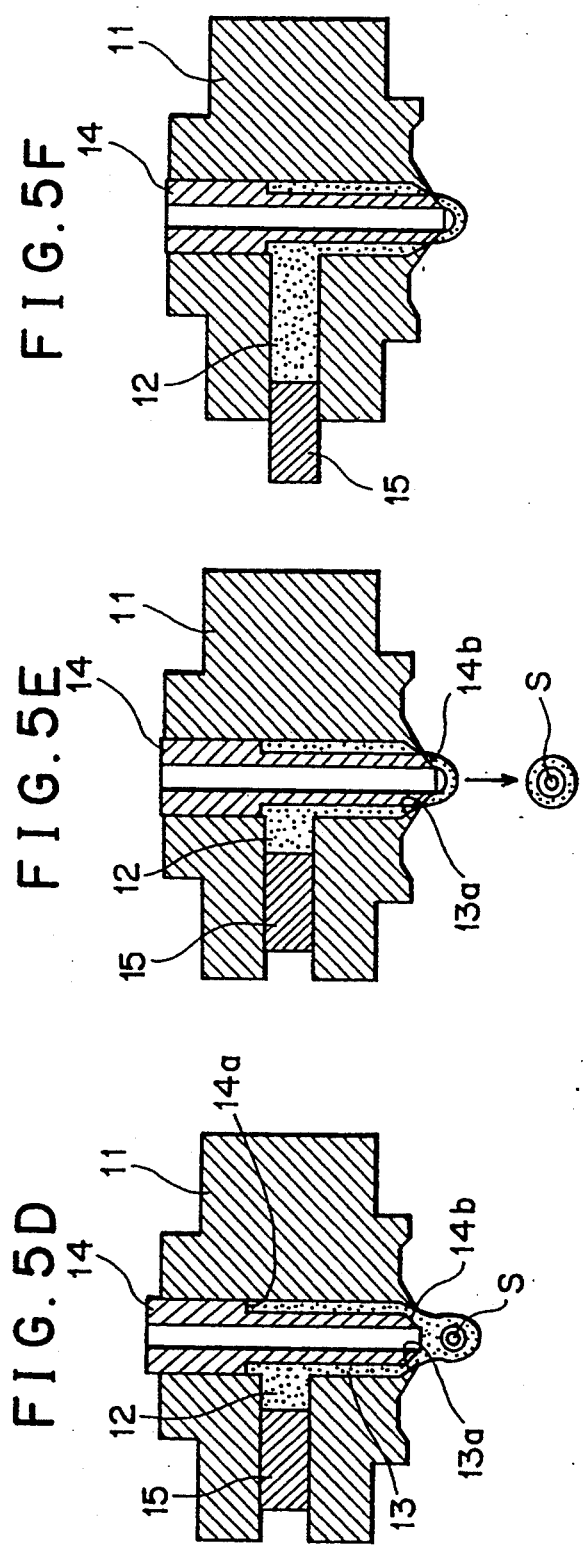

FIG. 6

| FIG. 6A |
| FIG. 6B |

FIG. 6A

APPARATUS FOR GEL-COATING SEED

This is a division of application Ser. No. 07/769,261, filed Oct. 1, 1991, now U.S. Pat. No. 5,254,358.

BACKGROUND OF THE INVENTION

1. Field of the Invention

The present invention relates to a method of gel-coating seed and an apparatus used therefore, and more particularly to a method of coating a seed efficiently and continuously with a gel layer containing nutrients, sterilizers or the like, and having elastic property, in which only the surface of the gel coating layer is cured for protecting the seed and the seed is sphericalized and enlarged for improving the germination rate and facilitating seeding. The invention also relates to an apparatus used for practicing such a method.

2. Description of the Prior Art

Conventionally, it is general that seeds without coating are sowed in a field. However, in order to protect seeds from being eaten by animals or to provide preliminary processing before sowing for improvement of the germination rate and sterilization, there have been used coated seeds. In the conventional seed-coating, the periphery of a seed is coated with coating material such as clay, fine sand, or those containing sugar while CMC (carboxymethyl cellulose) being sprayed on the surface of the seed as a binder. In the above example, comparatively hard coating material is used. On the other hand, there has been used soft coating method with gel or gelatin-like material that swells when the seed contains water.

In the conventional coating technique, however, there has not yet been known coating the seed by using an aqueous gel that cures only the surface of the gel coating layer.

SUMMARY OF THE INVENTION

It is therefore the object of the present invention to provide a method of gel-coating a seed into a larger spherical form, immersing the seed into a curing agent for a predetermined period of time to cure the surface of the gel-coating layer and, subsequently, taking the gel-coated seed out of the curing agent, washing out the deposited curing agent with water and curing only the surface of the layer, as well as an apparatus used therefore.

The forgoing object can be attained in accordance with the present invention by providing the gel-coating apparatus comprising: a nozzle portion for forming and cutting a gel coating film by opening and closing operation of a cutting plunger; a seed storing vessel moving upward and downward; an arm having a rotation shaft at the center thereof and a hollow needle at both ends thereof; a seed supply portion having pipes for communicating the needles with a negative pressure source and a positive pressure source by way of electromagnetic valves; a curing vessel provided below the nozzle portion; and a control section for synchronously operating the movement of the curing vessel, the nozzle portion, the seed storing vessel, the arm, and the seed supply portion.

In the gel-coating apparatus for seeds described above, one of the hollow needles is positioned just above the seed storing vessel so as to be inserted into the seeds in the seed storing vessel after the seed storing vessel at a lowest position is elevated. Then, a pipe of the hollow needle is communicated with the negative pressure source by the operation of the electromagnetic valves so that the seed is sucked at the tip of the hollow needle.

Subsequently, the seed storing vessel falls and the arm is positioned by pivotal movement. Then, the above pipe of the hollow needle is communicated with the positive pressure source so that the seed falls into the nozzle portion.

Meanwhile, in the nozzle portion, when the seed drops into a gel coating film formed at the lower end of the plunger hole, gel is caused to flow out to coat the seed by opening a valve of the plunger.

After a predetermined amount of gel flows out, the valve of the plunger is closed to stop the flow and the gel-coated seed falls gravitationally. Then, remaining gel at the lower end of the plunger hole forms a gel coating film again.

The falling gel-coated seed is sphericalized during its falling and is fed into the curing agent in the curing vessel to harden the surface thereof.

BRIEF DESCRIPTION OF THE DRAWINGS

The present invention will be more apparent from the ensuring description with reference to the accompanying drawing wherein:

FIGS. 5A to 5F are schematic views for explaining the gel-coating process;

DETAILED DESCRIPTION OF PREFERRED EMBODIMENTS

Figure 1:
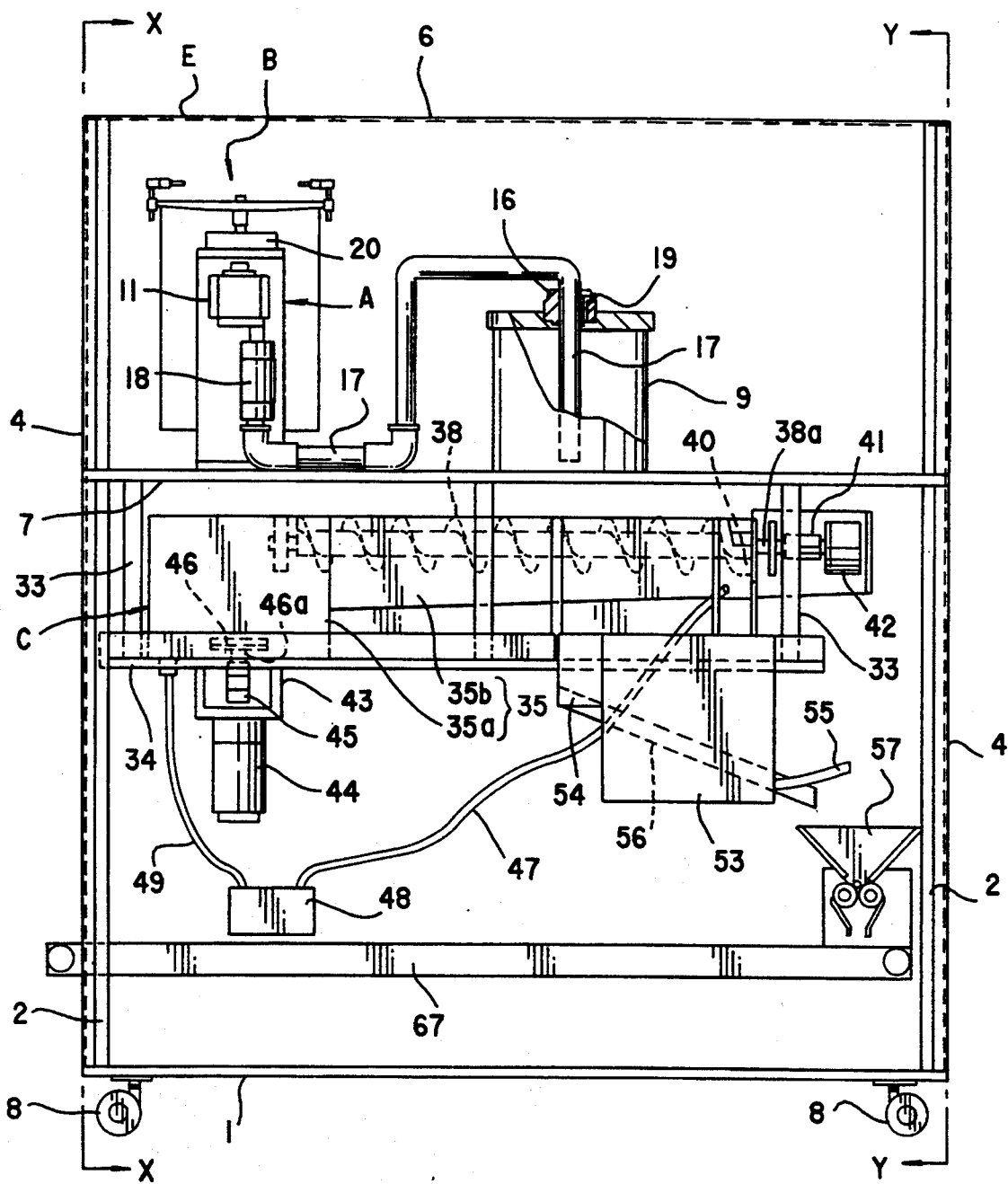
FIG. 1 is a front elevational view of a gel-coating apparatus for seeds with the front cover thereof being removed.
Figure 2:
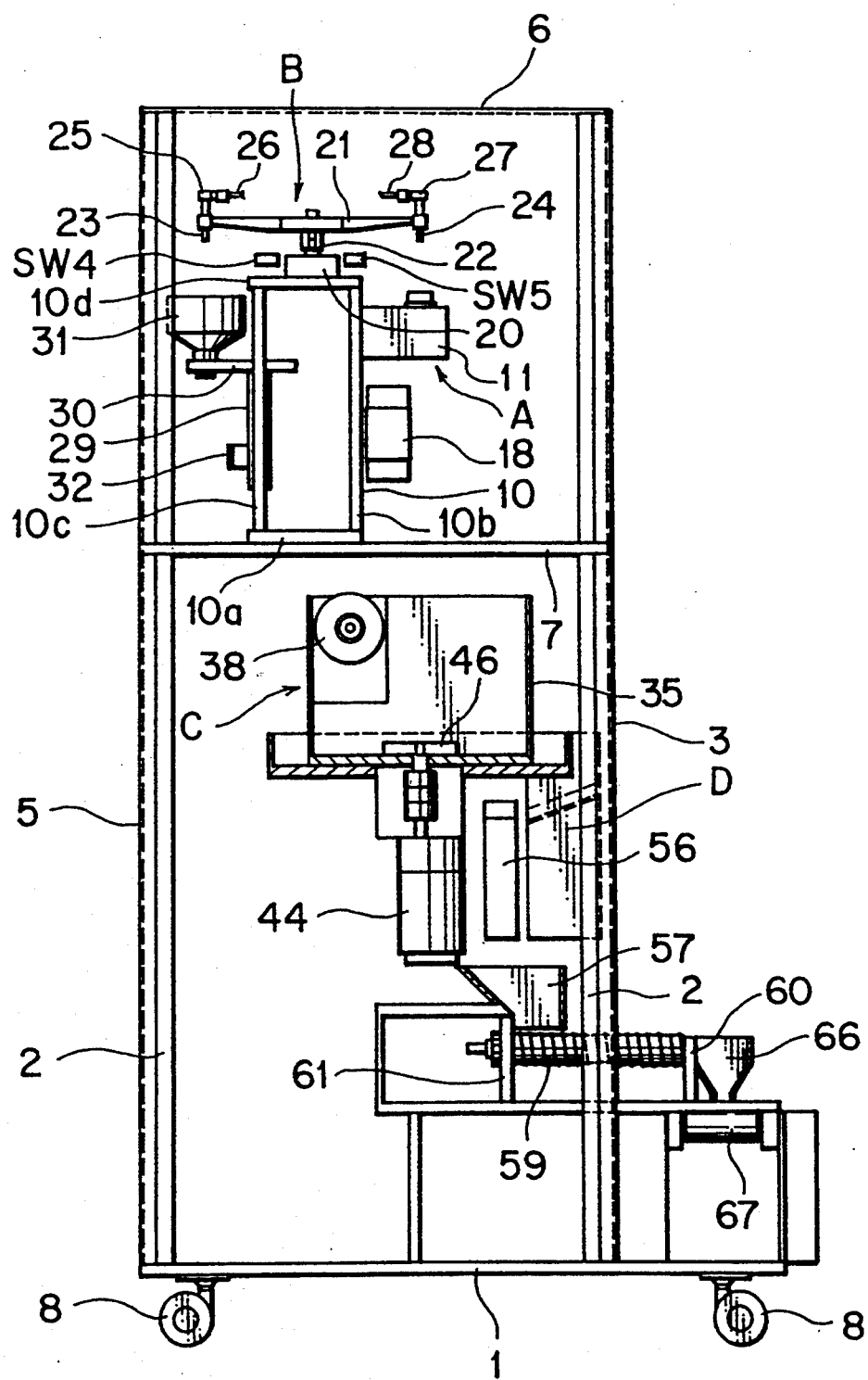
FIG. 2 is a view taken along the line X—X of FIG. 1.
Figure 3:
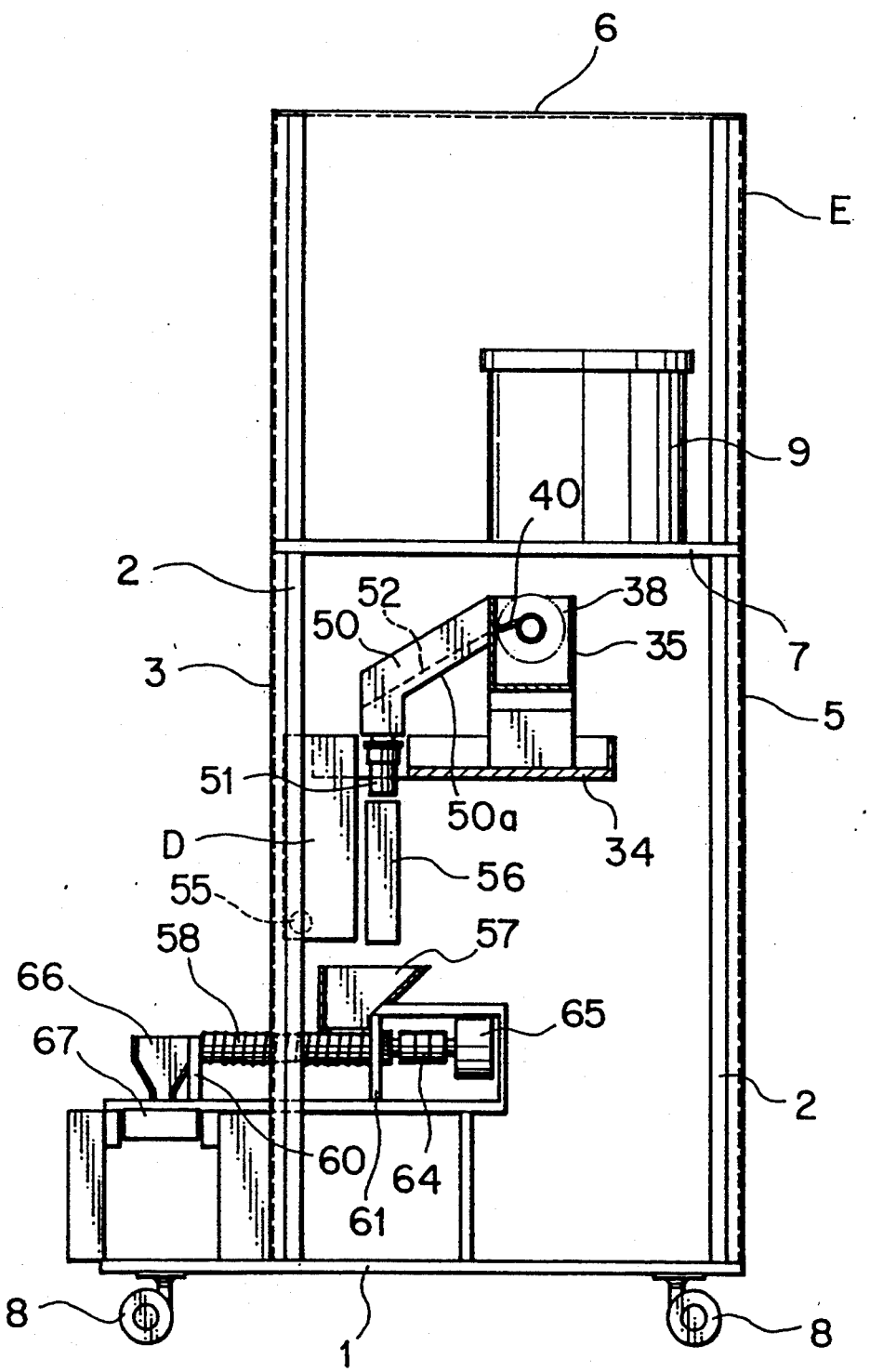
FIG. 3 is a view taken along the line Y—Y of FIG. 1.
Figure 4:
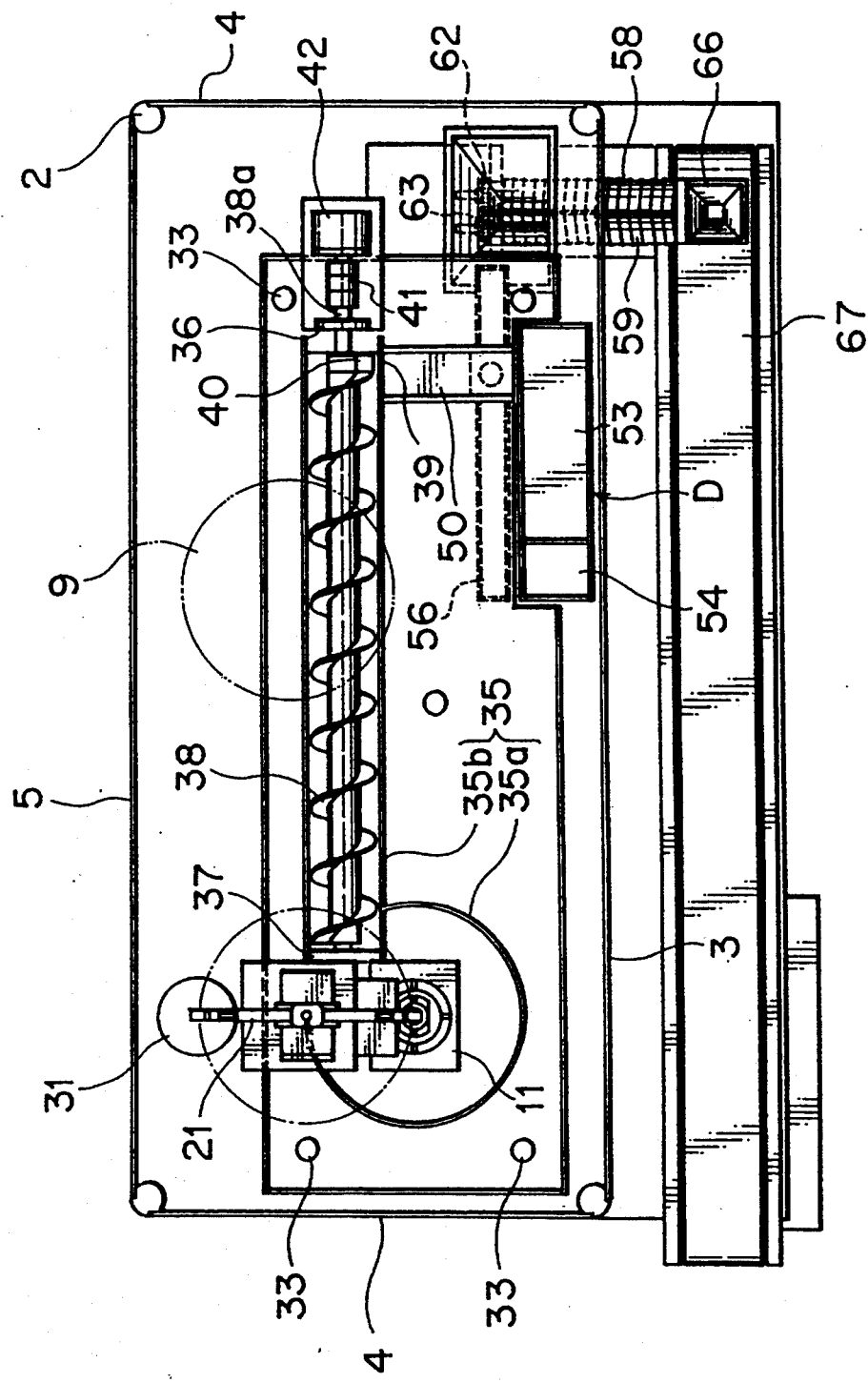
FIG. 4 is a plan view of the gel-coating apparatus for seeds with the upper cover thereof being removed.

Now, a gel-coating apparatus according to one embodiment of the present invention will be explained in reference with drawings. FIG. 1 is a front elevational view of the gel-coating apparatus with the front cover thereof being removed. FIGS. 2 and 3 show views taken along the line X—X and Y—Y of FIG. 1, respectively. Further, FIG. 4 is a plan view of the gel-coating apparatus with the upper cover thereof being removed.

The gel-coating apparatus for seeds comprises: a nozzle portion A forming and cutting a gel coating film; a seed supply portion B for feeding a seed to the nozzle portion A; a curing vessel provided below the nozzle portion A, a washing vessel D and a conveyor attached thereto; and a casing E for accommodating these devices.

A casing E consists of a front cover 3, side covers 4, and rear cover 5, which are fixed with screws to supports 2 on the corners of a bottom plate 1 thereof. At the top of the supports 2 is mounted an upper cover 6 to form a box. In the casing E is provided a shelf 7.

The casing is movable by casters 8 disposed on the corners of the bottom plate 1.

On the shelf 7 is mounted a gel storing vessel 9 and a frame 10.

The frame 10 is provided with a wall plate 10b on a side of a lower plate 10a (right side of the frame 10 in FIG. 2) and a shaft 10c on the other side of the lower plate 10a. On the wall plate 10b and the shaft 10c is mounted an upper plate 10d. Further, on the wall plate 10b is provided a nozzle main body 11 of the nozzle portion A.

As described in FIG. 5A, the nozzle main body 11 is provided with a plunger insertion hole 13 vertically penetrating a gel flow channel 12 which is formed inside the nozzle. A cylindrical cutting plunger 14 is inserted into the plunger insertion hole 13.

A pressure receiving portion 14a is formed along the center of the outer circumference of the cutting plunger 14. A tapered valve 14b is formed on the lower end of the plunger 14. Meanwhile, the upper end of the plunger 14 is urged by a spring not shown so that the valve 14b abuts a valve seat 13a.

In the gel flow channel is inserted a gel compression plunger 15. When the gel compression plunger 15 moves toward the direction in which the gel in the gel flow channel 12 is pressurized, the gel pressurizes the pressure receiving portion so that the cutting plunger 14 moves upward against the spring not shown, by which the valve 14b leaves the valve seat 13a. On the top of the gel storing vessel is provided a tube fitting 16, through which one end of a pipe 17 is inserted in the gel storing vessel 9. The other end of the pipe 17 is in communication with the gel flow channel by way of a ball check valve 18 mounted on the wall plate 10b.

The fitting 16 is provided with a small aperture 19 communicating the gel storing vessel 9 with an external pressure source.

With the aforementioned structure of the nozzle portion A, the gel in the gel storing vessel 9 is supplied to the gel flow channel 12 and the valve 14b of the cutting plunger 14 leaves the valve seat 13b by the operation of the gel compression plunger 15 to flow the gel.

A rotary portion of a rotary actuator 20 disposed on an upper plate 10d of the frame 10 is communicated with rotary shaft 22 on the center of the arm 21. Hollow needles 23 and 24 are respectively attached to both ends each of the arm 21, as shown in FIG. 2.

A pipe fitting 25 on the upper end of the hollow needle 23 is in communicated with a flexible end of a pipe 26 and the other end of the pipe 26 is connected to electromagnetic valves not show which are in communication with negative and positive pressure sources. The pipe 26 is provided with a pressure switch SW1 for detecting a predetermined negative pressure in the pipe 26, as described in FIG. 6. In the same manner as described above, a pipe fitting 27 on the upper end of the hollow needle 24 is communicated with a flexible end of a pipe 28 and the other end of the pipe 28 is connected to electromagnetic valves not show which are in communication with negative and positive pressure sources. The pipe 28 is provided with a pressure switch SW2 for detecting a predetermined negative pressure in the pipe 26, as described in FIG. 6.

On the outer circumference of the shaft 10c of the frame 10 is mounted a slider 29 which is elevated by a direct operated air cylinder not shown. On an end of a plate 30 attached to the upper end of the slider 29 is disposed a seed storing vessel S1. Further, a photoelectric switch SW3 is mounted on a bracket 32 on the side of the slider 29 for detecting the elevated distance of the seed storing vessel 31.

The rotary actuator 20 is capable of rotating in the range of 180°, by which the hollow needles 23 and 24 are alternately positioned just above the cutting plunger 14 of the nozzle portion A and the seed storing vessel 31. Whether or not the needles are positioned just above the predetermined position is detected by rotary switches SW4 and SW5 disposed near the rotary shaft 22.

With the structure of the seed supply portion B described above, the hollow needle 23 or 24 which sucks the seed in the elevated seed storing vessel is positioned just above the cutting plunger 14 of the nozzle portion A, which drops the seed into the nozzle portion A.

A curing vessel C installed below the nozzle portion A has a vessel 35 on a passage 34 which is suspended by supports 33 fixed to the lower surface of the shelf 7, as shown in FIG. 1.

The vessel 35 has a deep seed receiving portion 35a, which is positioned just below the nozzle portion A, and a shallow and oblong seed transporting portion 35b which is in communication with the seed receiving portion 35a. In the seed transporting portion 35b is installed a screw conveyor 38 of which both end portions are supported by bearings 36 and 37, as illustrated in FIG. 4. An end of the shaft 38a of the screw conveyor 38 is provided with a lifter 40, which is positioned adjacent to an outlet opening 39 formed at the upper and outlet end of the seed transporting portion 35b. The end of the shaft 38a is connected to a step motor 42 by way of a coupling 41.

Referring to FIG. 1, a motor bracket 43 is mounted on the outer surface of the bottom wall of the seed receiving portion 35a. By way of a coupling 45, an output shaft of a motor 44 disposed on the bracket 43 is connected to a shaft 46a of impellers 46, which watertightly penetrates the bottom wall of the seed receiving portion 35a.

The impellers 46 are provided for producing a stream to transport curing agent in the seed receiving portion 35a to the seed transporting portion 35b, by which the gel-coated seed dropping from the nozzle portion A is fed to the screw conveyor 38 in a short period of time.

The curing agent transported at an end of the seed transporting portion 35b is further conveyed to a pipe 49 by a pump 48 to be returned to the seed receiving portion 35a through a pipe 47 which is in communication with the end of the seed transporting portion 35b.

A downward-inclined chute 50 is disposed at the outlet opening 39 of the seed transporting portion 35b and the bottom wall 50a thereof is connected to a drain recovery portion 51. In the chute 50 is provided a perforated plate 52 parallel to the bottom wall 50a. In front of and below the perforated plate 52 is installed a washing vessel D, as shown in FIG. 3.

The washing vessel has a water vessel 53, a overflow vessel 54 at the outlet of the water vessel 53, and a pipe 55 which is in communication with an opening adjacent to a bottom portion of the water vessel 53 on its outlet side, by which supplied water from a resource flows toward the overflow vessel 54 and then is discharged after passing a net on the surface of the overflow vessel 54. On the other hand, the gel-coated seed fed to the water vessel is conveyed from the net to a slide 56 adjacent to the overflow vessel 54 of the water vessel 53.

Below the tip of the slide 56 is mounted a feed hopper 57 and below the hopper is arranged feed screws 58 and 59 of the driver and the follower.

The feed screws 58 and 59 each is supported bearings 60 and 61 at both ends thereof. Gears 62 and 63 fixed to the feed screws 58 and 59 are engaged with each other. Shallow spiral channels at the periphery of the feed screws 58 and 59 have twisted angles opposing each other. Further, to an end of the feed screw 58 is connected a step motor 65 by way of a coupling 64, as described in FIGS. 3 and 4.

Therefore, on starting the step motor 65, the coated seeds on the shallow spiral channel of both feed screws 58 and 59 are transported toward an outlet hopper 66 provided on the opposite side of the feed hopper 57 to be fed to a belt conveyor below the outlet hopper 66.

Next, operation of the gel-coating apparatus for seeds with the aforementioned structure will be explained.

As shown in FIG. 2, one hollow needle 23 is positioned just above the seed storing vessel 31 and the other hollow needle 24 just above the cutting plunger 14 of the nozzle portion A. Then, the position of the hollow needle 23 is confirmed by the rotary switch SW6 of FIG. 6. Further, the pipe 26 of the hollow needle 23 and the pipe 28 of the hollow needle 24 are interrupted by the electromagnetic valves from the negative and positive pressure sources.

Figure 6B:
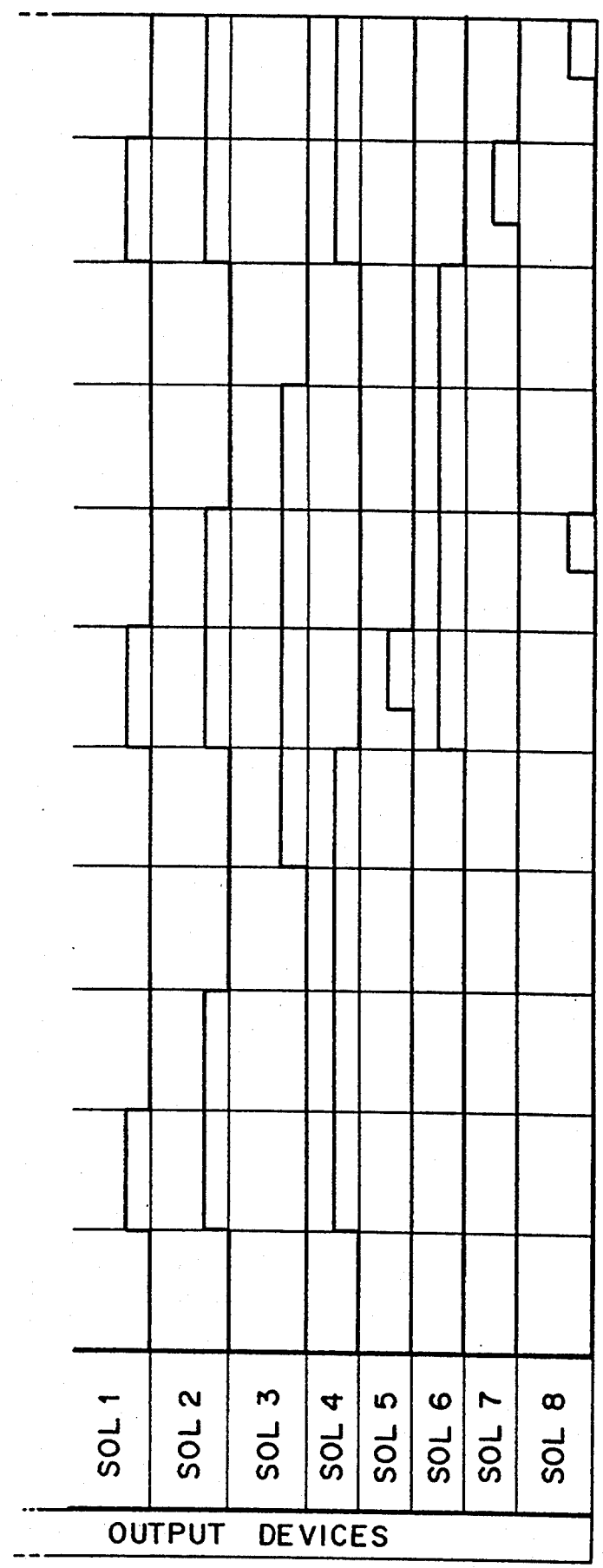
FIG. 6 is a sequence diagram for explaining the operation of the gel-coating process.

Referring to FIG. 6, on depressing automatic control switch, electromagnetic switches SOL1 and SOL2 for elevation are energized to open a high-pressure air circuit of the direct operated air cylinder not shown, causing the seed storing vessel to be elevated together with the slider 29 at a high velocity. Then, when photoelectric switch SW3 detects that the seed storing vessel 31 is elevated up to the predetermined height, only the electromagnetic valve for elevation SOL1 is deenergized, causing the direct operated air cylinder to be switched to a low speed air circuit, which reduces the elevation velocity of the seed storing vessel 31.

Meanwhile, an electromagnetic valve SOL4, through which the pipe 26 of the hollow needle 23 is communicated with the negative pressure source, is actuated so that the seed in the rising seed storing vessel 31 is sucked to the hollow needle inserted in the seeds.

When the hollow needle sucks the seed, negative pressure in the pipe increases. Then, the pressure switch SW1 will detect a prescribed negative pressure in the pipe 26.

Then, after the electromagnetic magnetic valve SOL1 and SOL2 are deenergized, the seed storing vessel moves downward. However, if the pressure in the pipe 26 does not reach to the prescribed negative pressure, the electromagnetic valve SOL1 and SOL2 are energized again to return the process, in which the hollow needle 23 sucks the seeds.

When the pressure switch SW1 confirms that a seed is sucked and also the switch SW6 at the lower limit confirms that the seed storing vessel falls to the limit, the electromagnetic valve SOL3 for rotation is energized to start the rotary actuator, causing the hollow needle 23 to be positioned just above the cutting plunger. The position of the hollow needle 23 is detected by an electromagnetic valve SW5. Then, the electromagnetic valves SOL1 and SOL2 are energized to raise the seed storing vessel 31 and the electromagnetic valve SOL4 is deenergized to interrupt the pipe 26 from the negative pressure source. Immediately after the electromagnetic valve SOL4 is deenergized, the electromagnetic valve SOL5 is excited to communicate the pipe 26 with the positive pressure source so that the seeds sucked by the hollow needle 23 fall down due to the increased pressure in the pipe 26.

Simultaneously, the electromagnetic valves SOL1 and SOL2 are energized again to raise the seed storing vessel 31, causing the other hollow needle 24 to suck the seeds.

Meanwhile, synchronously with the operation of the seed supply portion, a gel coating film is formed and cut in the nozzle portion.

That is, in the nozzle portion A, the pressure receiving portion 14a of the cutting plunger 14 is pressed by the operation of the gel compression plunger 15, by which the cutting plunger 14 moves upwardly against the spring and the valve at the lower end of the cutting plunger leaves the valve seat to open the valve. Then, the gel is discharged along the tapered surface of the valve seat to form a gel layer.

The gel coating film hangs down due to its own weight. Then, on closing the cutting plunger 14, the gel coating film falls down since the film can no more sustain its own weight. However, a part of the gel remains on the lower end of the plunger insertion hole 13 to form a new gel coating film, which hangs down due to its own weight again, as shown in FIG. 5F.

Onto the new gel coating film falls a seed S, as illustrated in FIG. 5B, causing the seed S to be enclosed by the gel coating film, as shown in FIG. 5C.

Referring to FIG. 6, an electromagnetic valve SOL8 is energized so that the gel compression plunger 15 pressurizes the gel in the gel flow channel. As a result, the pressure receiving portion 14a is pressurized to cause the cutting plunger 14 to move upward, permitting the valve to be opened, which cause the gel to flow out from the lower end of the plunger insertion hole 13. Consequently, the surface of the seed is coated with the gel as shown in FIG. 5D. After a predetermined period of time, the electromagnetic valve SOL8 is deenergized to close the cutting plunger 14, causing the gel coating film to fall down due to its own weight illustrated in FIG. 5E. However, a part of the gel remains on the lower end of the plunger insertion hole 13 to form a new gel coating film, which hangs down due to its own weight again, as shown in FIG. 5F.

The falling gel-coated seed is sphericalized during the falling and is fed to the curing agent in the seed receiving portion 35a of the curing vessel.

Since the curing agent in the seed receiving portion 35a flows toward the seed supply portion 35b, the gel-coated seed reaches inlet of the screw conveyor 38 in a short period of time and is further transported to a lifter at the outlet end of the screw conveyor by its rotation. Then, the seed is fed to the chute 50 by the rotation of the lifter 40.

Immersion time that the surface of the gel-coated seed is immersed in the curing agent is determined in such a manner as to almost be the same as the time for transportation of the seeds by the screw conveyor and the time for the transportation is fixed, which prevent the gel-coated seed to be insufficiently or excessively immersed.

In order to adjust the curing time in accordance with the condition of the gel-coated seed, rotation speed of the screw conveyor 38 is controlled. The gel-coated seed fed to the chute 50 rolls on the chute 50 to be fed to the water vessel 53 of the washing vessel D, where excessive curing agent adhered to the surface of the seed is removed.

Since water in the water vessel 53 flows toward the overflow vessel 54, washing time is controlled as a constant. The gel-coated seed is transported from the end of the overflow vessel 54 to the feed screws 58 and 59 by way of slide 56 and feed hopper 57 and is further conveyed by the rotation of the feed screw to outlet hopper 66 through the shallow spiral channel of the feed screws 58 and 59. Then the seed in the outlet hopper is transported by the belt conveyor 67.

The gel-coated seeds have water on the surface thereof. Therefore, the seeds adhere to the surface of the belt conveyor 67, preventing the seeds from falling down from the conveyor.

Next, another embodiment of vessels for curing and washing according to the present invention will be explained.

Figure 7:
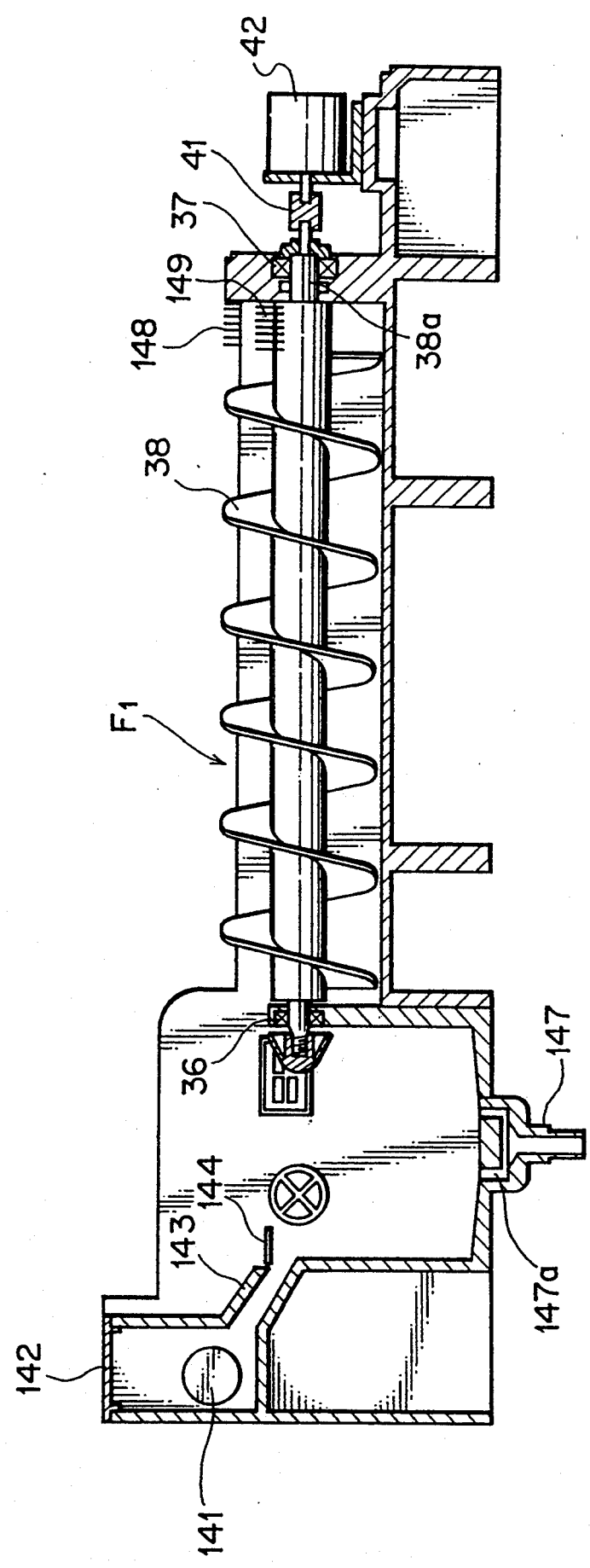
FIG. 7 is a longitudinal cross sectional view of the curing vessel F1 according to another embodiment of the present invention.
Figure 8:
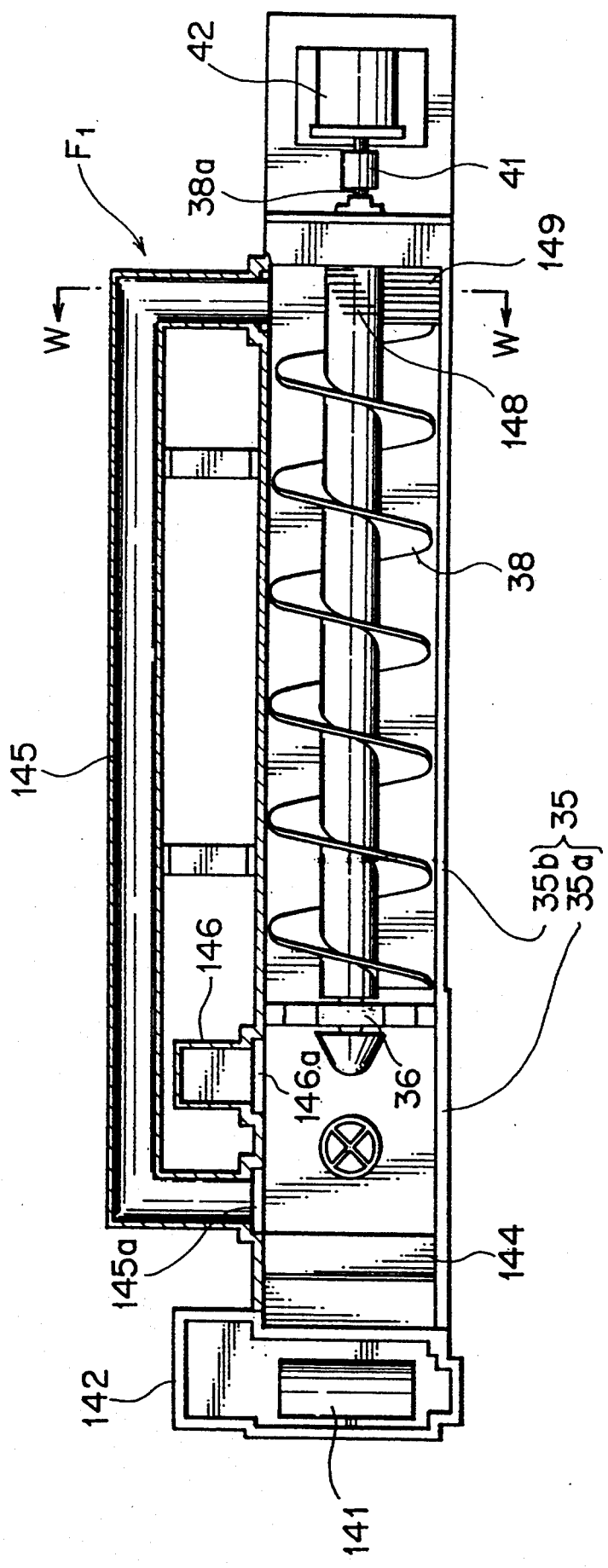
FIG. 8 is a plan view of the curing vessel F1.

FIGS. 7 and 8 are a longitudinal cross sectional view and a plan view of a curing vessel F1 according to another embodiment of the present invention. The curing vessel F1 has a deep seed receiving portion 35a, which is positioned where gel-coated seeds fall down to be fed, and a seed transporting portion 35b which is in communication with the seed receiving portion 35a. In the seed transporting portion 35b is installed a screw conveyor 38 of which both end portions are supported by bearings 36 and 37. An end of the shaft 38a of the screw conveyor 38 is provided with a lifter 148. The end of the shaft 38a is connected to a step motor 42 by way of a coupling 41. The structure of the curing vessel F1 is the same as that of the curing vessel C described above. However, at an end of the seed receiving portion 35a is provided a blower chamber 142 which accommodates a motor driven blower 141 and a blast pipe 143 from the blower chamber 142 to the surface of curing agent in the curing vessel F. At an end of the blast pipe 143 is provided blades 144 for controlling the direction of the blow.

At an end of the seed receiving portion 35b is provided a return pipe 145a in communication with an opening 145 of the seed receiving portion 35a. The seed receiving portion 35a is provided with an opening 146a of an overflow pipe 146 on inner wall thereof and an opening of a drain pipe 147 on a bottom wall.

In the curing vessel F1 described above, wind from the blower 141 strikes the surface of the curing agent of the seed receiving portion 35a by way of the control blades 144 so that the curing agent near the surface thereof flows toward the seed receiving portion, by which the gel-coated seeds, which are fed to the surface of the curing agent, are fed to the seed receiving portion 35a.

Figure 9:
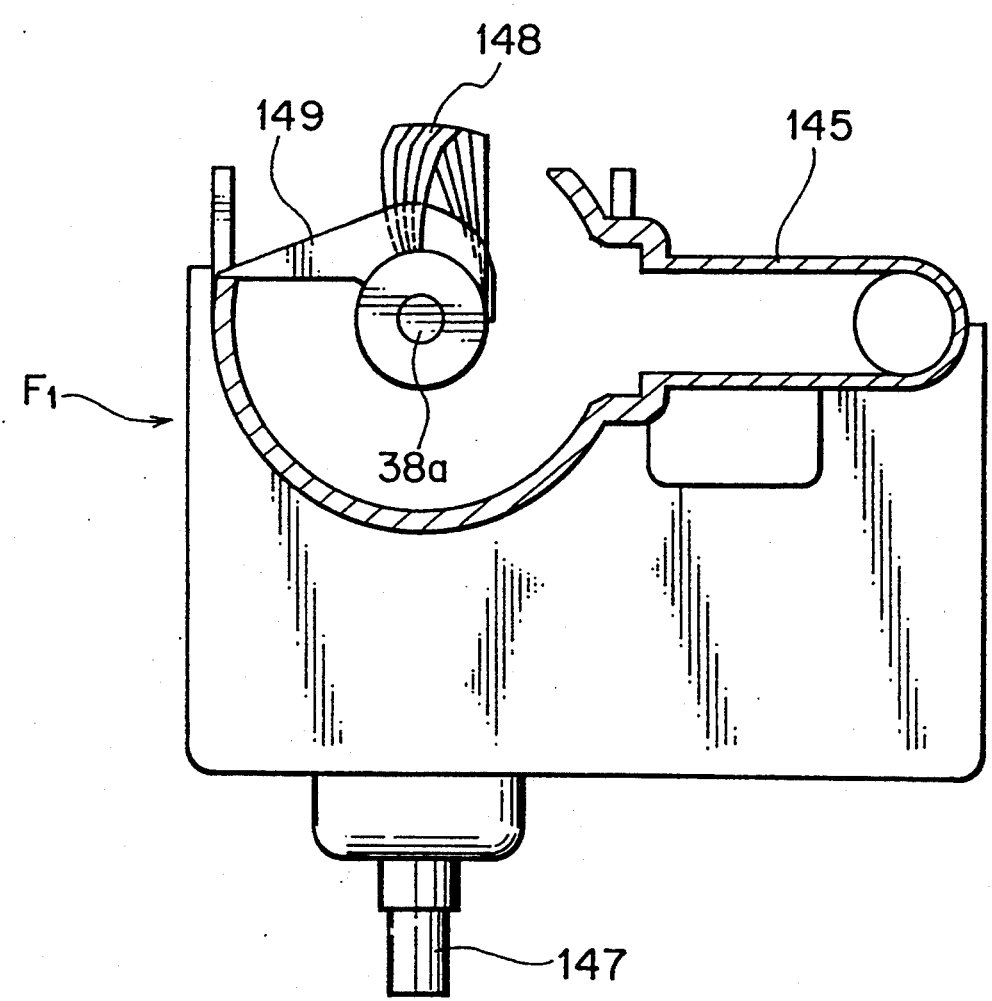
FIG. 9 is a view taken along the line W—W of the FIG. 8.

As shown in FIGS. 7 to 9, the lifter 148 has the shape of comb, in which teeth and slits are arranged alternately, and at the seed supply portion 35b is installed an outlet chute having slits through which the teeth of the lifter is able to pass.

In such a case, the gel-coated seeds are lifted by the lifter 148 and are fed to the outlet chute 149 to be rolled on the outlet chute 149 just before the lifter 148 passing through the outlet chute 149. Consequently, the gel-coated seeds are fed to the chute 50.

The lifter 40 used for the screw conveyor according to the first embodiment can also be applied for the screw conveyor according to this embodiment. On the other hand, the lifter 148 of this embodiment can be applied to the first embodiment.

In the curing vessels C and F1 each, the gel-coated seeds fed to the seed receiving portion are further fed to the screw conveyor 38 in a short period of time, permitting the curing time to be controlled to a predetermined period.

Therefore, in order to accurately control washing time in the washing vessel D, the washing vessel D is designed in such a manner to have the same structure as the curing vessels C and F1.

The gel-coating apparatus for seeds according to the present invention with the structure described above has following effects.

(1) All of the procedures for feeding of seeds, gel-coating of the seeds, curing of the surface of the coating are carried out continuously, automatically, and at high efficiency.

Since the gel-coated seed is larger in diameter and spherical in the shape and only the surface of the gel coating layer is cured to a predetermined depth, it is possible to obtain coated seeds easy for seeding and high germination rate. In addition, since seeds or the surface of the gel coating layer suffers from no external force during production step, there is no fear that the seeds are damaged or the surface of the gel coating layer is deformed or damaged.

(2) According to kinds of the seeds to be dressed, the thickness of the gel-coating layer can be controlled; a plurality of seeds are simultaneously gel-coated; and other changes in operational state are carried out with ease by changing programs of the sequencer.

(3) After it is confirmed that a hollow needle certainly sucks a seed, the hollow needle is positioned at a predetermined position for feeding the seed. Therefore, it is no fear that no seeds are gel-coated due to the error in the production process.

In addition, a gel-coating film is formed in accordance with the operation of the seed supply portion, there is no fear that a seed is fed too early or too late. As a result, the seed is accommodated in a sphericalized gel-coating layer.

(4) The present invention utilizes the phenomenon that remaining gel after closing a valve forms a gel-coating film. Therefore, it is possible to carry out the overall gel-coating process such as forming of a gel coating film, feeding of seeds, gel-coating of the seeds, and feeding of the gel-coated seed by applying and releasing the pressure to gel in the gel flow channel and feeding the gel synchronously with the operation.

(5) When a gel-coated seed is fed to a curing vessel, the seed is immersed in a curing agent for a predetermined period of time, which permits gel coating layer of the seed is cured in a predetermined depth. Further, after the curing, the cured seed is fed to a washing vessel to be washed for a predetermined period of time, resulting in optimal period of time in washing process.

In addition, the period of time for curing is optimally controlled by controlling the rotation speed of a screw conveyor and the washing time can be changed by increasing and decreasing the velocity of a stream.

In case that the washing vessel has the same structure as that of the curing vessel, the washing time is controlled more accurately.

(6) The process for curing of falling seeds and washing of the curing agent after curing is carried out continuously and automatically.

What is claimed is:

1. An apparatus for gel-coating seeds comprising:

a nozzle portion for forming and cutting a gel coating film for coating a seed by opening and closing a plunger such that a portion of said gel is cut off when said plunger is closed while retaining sufficient gel hanging gravitationally at a lower end of the nozzle portion to form another gel coating film for coating another seed;

a seed storing vessel moving upward and downward;

an arm having a rotatable support at a middle portion and a hollow needle at both ends each thereof;

a seed supply portion communicating said hollow needles with a negative pressure source and a positive pressure source by way of electromagnetic valves, the hollow needles being positioned to transfer a seed from the seed storing vessel to the nozzle portion such that as one hollow needle is positioned above the seed storing vessel, the other hollow needle is positioned above the nozzle portion;

a curing vessel for accommodating curing agent disposed below said nozzle portion for receiving gel coated seeds; and a control section, operatively connected to said nozzle portion, said seed storing vessel, said arm and said seed supply portion, for controlling said nozzle portion, said seed storing vessel, said arm, and said seed supply portion.

2. An apparatus for gel-coating seeds as claimed in claim 1, wherein said seed storing vessel is disposed on a slider which is slidably mounted to a shaft on a plate and moves upward and downward by means of a cylinder.

3. An apparatus for gel-coating seeds as claimed in claim 1, wherein said rotating support is fixed on a plate and horizontally rotates in the range of 180°.

4. An apparatus for gel-coating seeds as claimed in claim 1, wherein said curing vessel comprises:
  a seed receiving portion for accommodating curing agent;
  a seed transporting portion in communication with said seed receiving portion;
  a screw conveyor installed in said seed transporting portion;
  a lifter fixed to an outlet portion of said screw conveyor;
  a curing agent return pipe for communicating an end of said seed transporting portion with said seed receiving portion; and
  an impeller installed in said seed receiving portion for transporting said curing agent to said seed receiving portion.

5. An apparatus for gel-coating seeds as claimed in claim 1, wherein said curing vessel comprises:
  a seed receiving portion for accommodating curing agent;
  a seed transporting portion in communication with said seed receiving portion;
  a screw conveyor installed in said seed transporting portion;
  a lifter fixed to an outlet portion of said screw conveyor;
  a curing agent return pipe for communicating an end of said seed transporting portion with said seed receiving portion; and
  a blower for blowing wind on a surface of said curing agent in said seed receiving portion and toward said seed receiving portion.

6. An apparatus for gel-coating seeds as claimed in claim 4 or 5, wherein said lifter has the shape of comb, in which teeth and slits are arranged alternately, and an outlet chute having slits, through which said teeth of said lifter are able to pass, is installed at said seed supply portion.

7. An apparatus for gel-coating seeds as claimed in claim 1 further comprising a washing vessel for removing excessive curing agent on the surface of the gel-coated seeds.

8. An apparatus for gel-coating seeds as claimed in claim 7, wherein said washing vessel comprises:
  a water vessel;
  a pipe for communicating an end of said water vessel with a water source; and
  an overflow vessel having a net on an opening thereof, said overflow vessel being disposed at another end of said water vessel.

9. An apparatus for gel-coating seeds as claimed in claim 7, wherein said washing vessel comprises:
  a water vessel having a seed receiving portion and a seed transporting portion in communication with said seed receiving portion;
  a screw conveyor installed in said seed transporting portion;
  a lifter fixed to an outlet portion of said screw conveyor;
  a feed pipe for communicating said seed receiving portion with a water source; and
  a return pipe for communicating an end of said seed transporting portion with said seed receiving portion.

* * * * *